United States Patent

Schon

[15] 3,678,207

[45] July 18, 1972

[54] CIRCUIT ARRANGEMENT FOR TELEPHONE PRIVATE BRANCH EXCHANGES PERMITTING CONFERENCE CALLS BETWEEN SUBSCRIBER SETS HAVING VIDEO TRANSMISSION CAPABILITIES

[72] Inventor: Siegfried Schon, Starnberg, Germany

[73] Assignee: Siemens Aktiengesellschaft, Berlin and Munich, Germany

[22] Filed: June 18, 1970

[21] Appl. No.: 47,321

[30] Foreign Application Priority Data

June 19, 1969 Germany ......................P 19 30 925.2

[52] U.S. Cl. ........................................179/18 BC, 179/2 TV

[51] Int. Cl. ........................................................H04m 3/56

[58] Field of Search ..............179/18 BC, 1 CN, 2 TV, 18 BH

[56] References Cited

UNITED STATES PATENTS 3,519,744 7/1970 Dorros et al.........................179/2 TV

FOREIGN PATENTS OR APPLICATIONS 1,213,763 11/1970 Great Britain.....................179/18 BC

*Primary Examiner*—Kathleen H. Claffy
*Assistant Examiner*—Thomas W. Brown
*Attorney*—Birch, Swindler, McKie and Beckett

[57] ABSTRACT

A circuit arrangement is described for permitting conference calls between subscriber stations in a telephone private branch exchange wherein said subscriber stations, or at least a portion of them are equipped to transmit and receive video signals. When the conference call is initiated, the video receivers of the calling subscriber and the called subscribers are connected to a transmission line. At the initiation of the call, only the video transmitting means of the calling subscriber is connected to a second transmission line. The latter two transmission lines are electrically connected by means of an amplifier. Each of the called subscribers are connected to said first transmission line only by their video receiving means. Each of the called subscriber sets is equipped with a means by which the subscriber transmitting video can be disconnected from the line, and the subscriber actuating said means can connect his video transmitting means to the line. The switching means utilized will permit only one video transmitter to be connected to the line at any given time.

3 Claims, 2 Drawing Figures

CIRCUIT ARRANGEMENT FOR TELEPHONE PRIVATE BRANCH EXCHANGES PERMITTING CONFERENCE CALLS BETWEEN SUBSCRIBER SETS HAVING VIDEO TRANSMISSION CAPABILITIES

BACKGROUND OF THE INVENTION

This invention relates to the switching means in telephone private branch exchanges, and in particular to a switching arrangement in those exchanges having the capability of television transmission whereby conference calls between a plurality of subscribers are made possible.

In the presently available exchange systems for connecting telephone subscriber sets having television transmission and reception capabilities, the connection scheme is such that the transmitter of one subscriber is connected directly with the receiver of another subscriber, and the transmitter of the other subscriber is connected directly with the receiver of the first subscriber. If it is desired that more than two subscribers participate in a given call, i.e. a conference call, it can be seen that this is not possible through the ordinary exchange switching arrangement for interconnecting telephone-television subscriber sets.

It is therefore an object of this invention to provide a simple and economical means permitting the interconnecting of television transmitters and receivers in a plurality of subscriber sets for a conference call over a telephone private branch exchange.

The aforementioned and other objects are obtained by utilizing the principles of this invention wherein switching means are provided for connecting all video receivers of those subscriber stations to be connected in a conference call to the same transmission line. The latter switching means are rendered operative by the initiation of the conference call. Furthermore, the initiation of the conference call connects only the video transmitter of the subscriber initiating the call with a second transmission line, and this second transmission line is coupled with the first over an amplifier. If one of the called subscribers desires to transmit a video signal, means are provided by which he can disconnect the video transmitter of the calling subscriber and connect his video transmitter to the first mentioned transmission line. The latter may be accomplished by simply pressing a button or similar manually operable switch at the subscriber station from which it is desired that video be transmitted. By the means described herein and according to the principles of this invention, only one video signal at a time will ever be coupled to the transmission line. That is, means are provided for supervising the connection of only one video transmitter to the transmission line, and this means will disconnect the first connection upon occurrence of a connection demand signal from another subscriber station. Thus, even upon the presence of several connection demands, only one video transmitter will be permitted to be connected to the transmission line at any given time.

DETAILED DESCRIPTION OF THE DRAWINGS

Figure 1A:
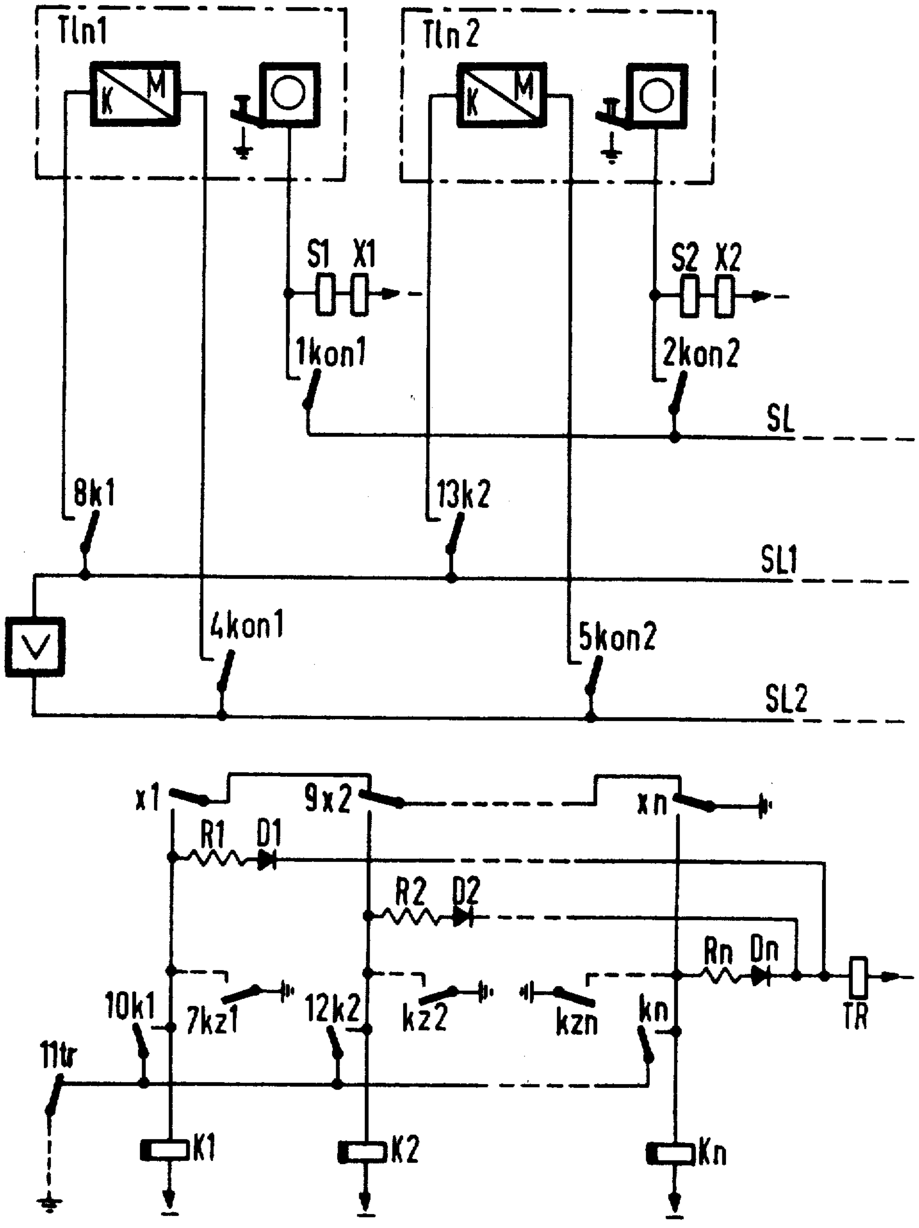
FIGS. 1*a* and 1*b* taken together are a schematic diagram of a preferred embodiment of a private branch exchange constructed according to the principles of this invention. To properly view the drawings FIGS. 1*a* and 1*b* should be laid side to side with FIG. 1*a* being at the viewer's left. Further, for purposes of clarity only the switching elements essential to the invention are shown, and many of the conventional switching elements necessary to carry on the switching operations of a private branch exchange have been omitted.
Figure 1B:
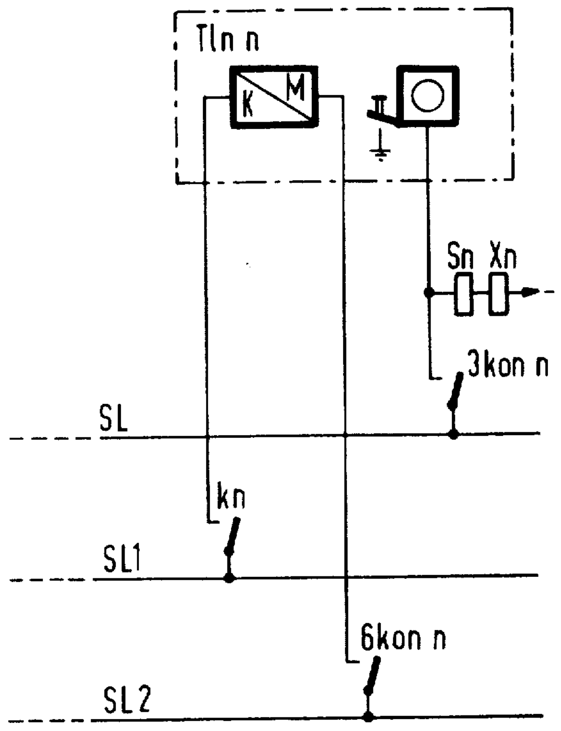

FIGS. 1*a* and 1*b* show a preferred embodiment of a private branch exchange having three subscriber stations, TLn1, TLn2 and TLnn, but as a practical matter, it is likely that most private branch exchanges will have many more subscriber stations and associated switching equipment. Each of the aforementioned subscriber stations are of a special type having video transmitting and receiving equipment; the video transmitter in each subscriber station is identified as K, and the video receiving equipment is identified as M. It is to be understood that the drawings illustrate only the portions of the subscriber networks necessary to describe the invention, and that in fact each subscriber station will have all of the conventional elements necessary to make a call connection. That is, with respect to each subscriber station only the relays S and X, to be described more fully below, are shown, and these switching elements are necessary for the push-button at each subscriber station. Furthermore, only that exchange switching equipment is shown which is necessary to an understanding of the invention, and the equipment not shown is to be considered conventional.

In describing the preferred embodiment it will be assumed that the subscriber at TLn1 is the calling subscriber, and he initiates a conference call to the subscriber at TLn2 and TLnn. In order to initiate such a conference call the subscriber at TLn1 dials in the well known manner a numbering code imparting to the system the information that a conference call is being initiated and following this code the identifying numbers of the subscriber stations are dialed as well. The dialing equipment used is not shown, but conventional telephone dial equipment is contemplated. Upon the actuation of the conference call identifying digit and the identifying numbers of the call subscriber stations, the relays KON1, KON2 and KONn are actuated. These relays are not shown in the drawings, but their contacts are shown. The actuation of these relays closes contact 1kon1, 2kon2 and 3konn, connecting the respective subscriber stations to a special conference call transmission line SL. In particular the relays S and X of the respective subscriber stations are connected to the aforementioned transmission line. Furthermore, by actuation of these relays the contacts 4kon1 and 5kon2 and 6konn are closed connecting the video receivers M in each of the subscriber stations to an additional conference call transmission line SL2.

It is stated hereinabove that in order to initiate a conference call, the calling subscriber at TLn1 dials a special identification digit. By dialing this digit, a relay Kz1 is actuated. This relay is not shown, but certain of its contacts are shown in FIG. 1*a*. When the latter relay is actuated by the calling subscriber at TLn1, the contact 7kz1 is closed to allow a time delay relay K1 to be excited. Actuation of relay K1 causes the closing of contact 8k1 connecting the video transmitter K in subscriber station TLn1 to a transmission line for conference calls SL1. The latter transmission line is electrically connected via an amplifier to transmission line SL2. Thus, the picture sent by subscriber station TLn1 will appear in the video receivers of the called subscriber stations, because these subscriber stations have been connected to the transmission line SL2 by the actuation of the relay KON associated with each of the called subscriber stations. Actuation of relay K1 also closes contact 10k1 forming a holding circuit for the relay over contact 11tr, resistor R1, diode D1 and relay TR. The latter series of elements also forms a completed excitation circuit for relay TR.

If, during the course of the conference call, a subscriber at one of the called subscriber stations wishes to speak and to transmit a video signal, this subscriber need only operate a push-button switch at his subscriber station to actuate a differential relay X. If, for example, the subscriber at station TLn2 wishes to transmit, the relay X2 is caused to respond. The operation of relay X2 causes contact 9x2 to complete an excitation circuit for a relay K2 as shown in FIG. 1*a*. Operation of relay K2 closes the contact 13k2 to connect the video transmitter K of station TLn2 to the transmission line SL1. Additionally, the contact 12k2 is closed forming a holding circuit for relay K2 over resistor R2, diode D2 and the relay TR. This completed holding circuit also forms a further completed excitation circuit for relay TR. At the instant of operation of relay K2 the relay K1 is still operative.

Referring to the holding circuit for relay K1, the resistor R1 is chosen to be of such a value that even though current is flowing through it to the relay TR the latter relay will not respond. However, with the actuation of the holding circuit through resistor R2, a second current path is completed through the relay TR. This second current path is sufficient along with the path through resistor R1 to cause relay TR to respond. The response of relay TR opens contact 11tr, thereby opening the holding circuit for relay K1, rendering the latter relay inoperative. Because the operation of the push button at station TLn2 requires a longer period of time than the response of relay TR, the relay K2 remains operative despite the opening of the holding circuit by the opening of contact 11tr. As soon as contact 10k1 is open, the current path through resistor R1 to the relay TR is opened so that current only flows through this relay now by means of the path formed by the closed contact 12k2, resistor R2 and diode D2. The latter path includes a resistance of such a value that the current therethrough is not sufficient to maintain the relay TR in a responsive condition so that the contact 11tr is again closed completing the holding circuit for the now actuated relay K2. Therefore, only the video transmission from station TLn2 over contact 13k2 appears on the conference call transmission lines. This video transmission will be received by the video receiver portions of the other subscriber stations. Therefore, with each further actuation of a push-button switch at a different subscriber station, the process proceeds in the foregoing manner. That is, with each actuation of a different subscriber station switch the previously connected television transmitter is disconnected and the television transmitter assigned to the subscriber station to which the push-button or switch was actuated is connected.

It is contemplated that the chains of $x$ contacts which form the connection circuits for the K relays can be replaced by an electronic selection chain in order to prevent the condition that the contact closer to positive potential is always favored over contacts located a greater distance from the positive potential.

The description of a preferred embodiment given hereinabove, is only exemplary, and it will be readily apparent to those skilled in the art that a number of modifications and changes to the circuit elements and their relationship may be made within the scope of the appended claims.

I claim

1. A circuit arrangement for permitting conference calls among subscribers in a private branch telephone exchange or the like wherein certain of the subscriber stations include means for transmitting and means for receiving video signals, comprising:

means for initiating a conference call at each said subscriber station, first transmission line means for interconnecting said subscriber stations, first switching means in each of said subscriber stations operable in response to operation of one of said initiating means for connecting said video receiving means of predetermined ones of said subscriber stations to said first transmission line means, said predetermined ones of said subscriber stations being selected by said initiating means, second transmission line means electrically connected to said first transmission line means, connecting switch means at each said subscriber station operable to cause the connection of the video transmitter therein to said second transmission line means, second switching means in each said subscriber station for connecting the video transmitter means therein to said second transmission line means, one of said second switching means being rendered operable by the actuation of the said connecting switch means associated therewith, and third switching means for disconnecting the one of said second switching means previously operated upon receipt of connection demand signal from another of said subscriber stations via the connecting switch means therein and for permitting the second switching means of said other subscriber station to connect the video transmitter therein to said second transmission line means.

2. The circuit arrangement defined in claim 1 wherein each said connecting switch means includes a manually operable switch means.

3. The circuit arrangement defined in claim 1 wherein said third switching means comprises a switch element connected in series with a holding circuit for said second switching means, said switch element being in a first condition closing said holding circuit when one of said second switching means is operative and in a second condition opening said circuit when another of said second switching means is rendered operative, said other second switching means being maintained in an operative condition by continued actuation of said connecting switch means until said switch element returns to said first condition.

* * * * *